US011179798B2

(12) United States Patent
Aoyama et al.

(10) Patent No.: US 11,179,798 B2
(45) Date of Patent: Nov. 23, 2021

(54) PART STOPPING/PASSING UNIT, AND THREAD FASTENING DEVICE (71) Applicant: Shoji Aoyama, Osaka (JP)

(72) Inventors: Shoji Aoyama, Osaka (JP); Yoshitaka Aoyama, Osaka (JP)

(73) Assignee: Shoji Aoyama, Osaka (JP)

( * ) Notice: Subject to any disclaimer, the term of this patent is extended or adjusted under 35 U.S.C. 154(b) by 402 days.

(21) Appl. No.: 16/306,942

(22) PCT Filed: Apr. 28, 2017

(86) PCT No.: PCT/JP2017/016896
§ 371 (c)(1),
(2) Date: Dec. 4, 2018

(87) PCT Pub. No.: WO2018/016152
PCT Pub. Date: Jan. 25, 2018

(65) Prior Publication Data
US 2019/0134736 A1 May 9, 2019

(30) Foreign Application Priority Data

Jul. 19, 2016 (JP) .............................. JP2016-155006
Feb. 22, 2017 (JP) .............................. JP2017-046705
Apr. 3, 2017 (JP) .............................. JP2017-084043

(51) Int. Cl.
B23K 11/14 (2006.01)
B23P 19/06 (2006.01)
B65G 47/88 (2006.01)

(52) U.S. Cl.
CPC .............. B23K 11/14 (2013.01); B23P 19/06 (2013.01); B65G 47/88 (2013.01)

(58) Field of Classification Search
CPC ..... B23P 19/002; B23P 19/004; B23P 19/005; B23P 19/006
See application file for complete search history.

(56) References Cited

U.S. PATENT DOCUMENTS 3,261,481 A * 7/1966 Laverty .................. H01H 11/00
414/618
3,494,393 A * 2/1970 Casanov ................. B25B 23/12
81/57.37

(Continued)

FOREIGN PATENT DOCUMENTS

EP 2 133 168 12/2009
JP 2008-246575 10/2008

OTHER PUBLICATIONS

International Search Report dated Jul. 11, 2017 in International (PCT) Application No. PCT/JP2017/016896.

(Continued)

Primary Examiner — Jason L Vaughan
(74) Attorney, Agent, or Firm — Wenderoth, Lind & Ponack, L.L.P.

(57) ABSTRACT

Provided is apart stopping/passing unit for apart including a unit main body having a part passage, an opening/closing member configured to open and close the part passage, and an attracting mechanism. The opening/closing member includes a stopper surface for stopping a part and a passing hole for allowing the part to pass therethrough. The attracting mechanism is configured to position the part by an attracting force when the stopper surface takes a part stopping position, and to allow the part to pass by elimination of an attraction force when the passing hole takes a part passing position.

5 Claims, 7 Drawing Sheets

(56) References Cited

U.S. PATENT DOCUMENTS

| | | | | |
|---|---|---|---|---|
| 3,760,485 A * | 9/1973 | Smith | ............... | B23P 19/006 29/813 |
| 4,815,343 A * | 3/1989 | Sofinowski | ........... | B23P 19/006 81/431 |
| 5,007,795 A * | 4/1991 | Yoshimura | ........... | B23K 37/047 198/468.5 |
| 5,035,039 A * | 7/1991 | Aoyama | ................. | B23P 19/04 29/445 |
| 5,044,519 A * | 9/1991 | Aoyama | ................. | B25C 1/001 221/212 |
| 5,295,295 A * | 3/1994 | Aoyama | ............... | B23P 19/006 29/813 |
| 5,359,171 A * | 10/1994 | Aoyama | ................. | B23K 9/206 219/93 |
| 5,372,279 A * | 12/1994 | Aoyama | ............... | B23P 19/006 221/251 |
| 6,102,193 A * | 8/2000 | Rivers, Jr. | ............ | B23P 19/002 198/468.5 |
| 8,800,409 B1 * | 8/2014 | Wuester, Sr. | ........... | B25B 23/04 81/57.37 |
| 9,316,247 B2 * | 4/2016 | Butvin | ................... | B21J 15/32 |
| 9,481,093 B2 * | 11/2016 | Ikeda | .................. | B25J 15/0616 |
| 9,511,416 B2 * | 12/2016 | Godfrey | ................ | B21J 15/326 |
| 2010/0059486 A1 | 3/2010 | Aoyama et al. | | |

OTHER PUBLICATIONS

Extended European Search Report dated Jan. 22, 2020 in corresponding European Patent Application No. 17830672.6.

International Preliminary Report on Patentability and Written Opinion of the International Searching Authority dated Jan. 22, 2019 in International (PCT) Application No. PCT/JP2017/016896.

* cited by examiner

PART STOPPING/PASSING UNIT, AND THREAD FASTENING DEVICE

TECHNICAL FIELD

The present invention relates to a part stopping/passing unit, which is mountable to various types of devices, and is configured to allow reliable stopping and passing of a part, and to a screw fastening device.

BACKGROUND ART

In Japanese Patent Application Laid-open No. 2008-246575, the following configuration is described. A part passage is opened and closed with an opening/closing member of an advancing/retreating type. When a part is to be stopped, the part is placed on a stopper surface of the opening/closing member so that the part is stopped. When a part is to be allowed to pass, a passing hole of the opening/closing member is caused to match the part passage so that the part is allowed to pass.

CITATION LIST

Patent Literature 1: JP 2008-246575 A

SUMMARY OF INVENTION

Technical Problem

According to the technology described in Patent Literature mentioned above, when the part stopping/passing unit is inclined or reversed up and down while the part is placed on the stopper surface, the part moves to a position apart from the stopper surface. Therefore, there arises a problem in that the part is not present at a predetermined position in a stage of allowing the next part to pass. Moreover, when the part collides with the stopper surface at high speed, the part may be bounced off to cause abnormality in stopping posture of the part.

The present invention provides a part stopping/passing unit to solve the problems described above, and has the following main objects to reliably stop a part, which has been transferred at high speed, at a predetermined position and maintain the stopping position even when an arrangement posture of the part stopping/passing unit changes to any posture, and to improve operability of a screw fastening device.

Solution to Problem

According to a first aspect of the present invention, there is provided a part stopping/passing unit comprising: a unit main body having apart passage; an opening/closing member configured to open and close the part passage, wherein the opening/closing member comprises a stopper surface for stopping a part and a passing hole for allowing the part to pass therethrough; and an attracting mechanism, which is configured to position the part by an attracting force when the stopper surface takes a part stopping position, and to allow the part to pass by elimination of an attraction force when the passing hole takes a part passing position, or a pressing mechanism, which is configured to position the part by a pressing force when the stopper surface takes the part stopping position, and to allow the part to pass by elimination of a pressing force when the passing hole takes the part passing position.

Advantageous Effects of Invention

When apart is to be stopped, the opening/closing member moves so that the stopper surface closes the part passage, and at the same time, the attracting mechanism is brought to a part attracting position. Thus, the part stopped by the stopper surface receives an attraction force from the attracting mechanism under a state in which the part is held in contact with the stopper surface. Therefore, even when the part collides with the stopper surface, the part is prevented from being bounced off, and is positioned at a predetermined position in contact with the stopper surface. In the case of the pressing mechanism, when apart is to be stopped, the opening/closing member moves so that the stopper surface closes the part passage, and at the same time, the pressing mechanism is brought to a part pressing position. Thus, the part stopped by the stopper surface receives a pressing force from the pressing mechanism under a state in which the part is held in contact with the stopper surface. Therefore, even when the part collides with the stopper surface, the part is prevented from being bounced off, and is positioned at a predetermined position in contact with the stopper surface.

For example, in a case in which the attracting mechanism comprises a permanent magnet, when the stopper surface closes the part passage, the permanent magnet is brought to a position close to the part passage. With such a configuration, an attracting force of the permanent magnet reliably acts on the part, and hence the part is positioned at a position in contact with the stopper surface. Thus, even when the part stopping/passing unit according to the present invention is mounted to an electric resistance welding machine which operates with a robot device, apart such as a projection bolt is positioned at a predetermined position, and a welding operation is normally performed therefor. In a case in which the pressing mechanism comprises a pressing member operated by an air cylinder or the like, when the stopper surface closes the part passage, the pressing member is positioned at a position of pressing the part. With such a configuration, a pressing force of the pressing member reliably acts on the part, and hence the part is positioned at a position in contact with the stopper surface. Thus, even when the part stopping/passing unit according to the present invention is mounted to an electric resistance welding machine which operates with a robot device, a part such as a projection bolt is positioned at a predetermined position, and a welding operation is normally performed therefor.

Moreover, when the passing hole opens the part passage, the permanent magnet is positioned at a position apart from the part passage. With such a configuration, the attracting force of the permanent magnet with respect to the part is substantially eliminated, and the part is allowed to pass through the passing hole. In the case of the pressing mechanism, when the passing hole opens the part passage, the pressing member is positioned at a position apart from the part passage. With such a configuration, the pressing force of the pressing member with respect to the part is eliminated, and the part is allowed to pass through the passing hole.

The part is attracted by the attracting mechanism under the state in which the part is held in contact with the stopper surface, and hence the part is evenly held in the stopping posture. Therefore, when the passing hole is opened, the part passes through the passing hole in a normal posture so that the part is normally transferred. In particular, when the part held in contact with the stopper surface by the attracting mechanism is attracted to an inner surface of the part passage, the stopping posture of the part can always be kept constant, thereby being capable of maintaining a normal part posture at the time of passage through the passing hole. In the case of the pressing mechanism, the part is pressed by the pressing mechanism under the state in which the part is held in contact with the stopper surface, and hence the part is evenly held in the stopping posture. Therefore, when the passing hole is opened, the part passes through the passing hole in a normal posture so that the part is normally transferred. In particular, when the part held in contact with the stopper surface by the pressing mechanism is pressed against the inner surface of the part passage, the stopping posture of the part can always be kept constant, thereby being capable of maintaining a normal part posture at the time of passage through the passing hole.

The part is positioned at the position in contact with the stopper surface, and hence the presence of the part is reliably detected. That is, the stopping position of the part is always at the constant position. Thus, a detector such as a photoelectric sensor can easily be arranged, and a stable sensor operation can be assured at the same time.

According to a second aspect of the present invention, there is provided the part stopping/passing unit, wherein an end portion of the unit main body is coupled to a support base member having a part passing hole, wherein an insertion hole for guiding the opening/closing member is formed by a recessed groove, which is formed at the end portion of the unit main body, and by the support base member, and wherein an advancing/retreating driver configured to perform an opening/closing operation for the opening/closing member is mounted through intermediation of a support member coupled to the unit main body or the support base member.

Through coupling of the unit main body having the recessed groove to the support base member, the insertion hole for allowing the advancing/retreating operation of the opening/closing member is formed. Thus, the insertion hole can easily be formed. Moreover, it is only required that the recessed groove be formed at an end portion of the unit main body by a simple processing method. Thus, processing such as drilling which causes increase in the number of processing steps can be avoided, and hence it is effective for improvement in productivity.

The advancing/retreating driver comprising an air cylinder, an advancing/retreating output electric motor or the like is mounted through intermediation of the support member coupled to the unit main body or the support base member. Therefore, the integrated structure of the advancing/retreating driver with the unit main body or the support base member can be secured with a high coupling rigidity, and simplification of the structure can be achieved.

According to a third aspect of the present invention, there is provided a screw fastening device, wherein the part stopping/passing unit is mounted to a main base member, which is coupled to a robot device, for allowing a bolt to stop and pass, wherein a screw fastening unit configured to hold the bolt and screw the bolt into a threaded hole being a target location is mounted to the main base member, and wherein a holding head configured to hold the bolt at the screw fastening unit or a holding unit configured to temporarily lock the bolt at a position coaxial with the screw fastening unit is arranged on a downstream side of the part stopping/passing unit.

When a bolt is to be stopped, the opening/closing member moves so that the stopper surface closes the part passage, and at the same time, the attracting mechanism is brought to a part attracting position. Thus, the bolt stopped by the stopper surface receives the attraction force from the attracting mechanism under a state in which the bolt is held in contact with the stopper surface. Therefore, even when the bolt collides with the stopper surface, the bolt is prevented from being bounced off, and is positioned at a predetermined position in contact with the stopper surface. In the case of the pressing mechanism, when a bolt is to be stopped, the opening/closing member moves so that the stopper surface closes the part passage, and at the same time, the pressing mechanism is brought to a bolt pressing position. Thus, the bolt stopped by the stopper surface receives the pressing force from the pressing mechanism under a state in which the bolt is held in contact with the stopper surface. Therefore, even when the bolt collides with the stopper surface, the bolt is prevented from being bounced off, and is positioned at a predetermined position in contact with the stopper surface.

For example, in a case in which the attracting mechanism comprises a permanent magnet, when the stopper surface closes the part passage, the permanent magnet is brought to a position close to the part passage. With such a configuration, the attracting force of the permanent magnet reliably acts on the bolt, and hence the bolt is positioned at a position in contact with the stopper surface. In a case in which the pressing mechanism comprises a pressing member operated by an air cylinder or the like, when the stopper surface closes the part passage, the pressing member is positioned at a position of pressing the bolt. With such a configuration, the pressing force from the permanent magnet reliably acts on the bolt, and hence the bolt is positioned at a position in contact with the stopper surface.

Moreover, when the passing hole opens the part passage, the permanent magnet is positioned at a position apart from the part passage. With such a configuration, the attracting force of the permanent magnet with respect to the bolt is substantially eliminated, and the bolt is allowed to pass through the passing hole. In the case of the pressing mechanism, when the passing hole opens the part passage, the pressing member is positioned at a position separated apart from the part passage. With such a configuration, the pressing force of the pressing member with respect to the bolt is eliminated, and the bolt is allowed to pass through the passing hole.

The bolt is attracted by the attracting mechanism under the state in which the bolt is held in contact with the stopper surface, and hence the bolt is evenly held in the stopping posture. Therefore, when the passing hole is opened, the bolt passes through the passing hole in a normal posture so that the bolt is normally transferred. In particular, when the bolt held in contact with the stopper surface by the attracting mechanism is attracted to an inner surface of the part passage, the stopping posture of the bolt can always be kept constant, thereby being capable of maintaining a normal part posture at the time of passage through the passing hole. In the case of the pressing mechanism, the bolt is pressed by the pressing mechanism under the state in which the bolt is held in contact with the stopper surface, and hence the bolt is evenly held in the stopping posture. Therefore, when the passing hole is opened, the bolt passes through the passing hole in a normal posture so that the bolt is normally transferred. In particular, when the bolt held in contact with the stopper surface by the pressing mechanism is pressed against the inner surface of the part passage, the stopping posture of the bolt can always be kept constant, thereby being capable of maintaining a normal bolt posture at the time of passage through the passing hole.

The bolt is positioned at the position in contact with the stopper surface, and hence the presence of the bolt is reliably detected. That is, the stopping position of the bolt is always at the constant position. Thus, a detector such as a photoelectric sensor can easily be arranged, and a stable sensor operation can be assured at the same time.

The part stopping/passing unit and the screw fastening unit are mounted to the main base member, and hence the part stopping/passing unit and the holding head or the holding unit configured to hold the bolt can be arranged close to each other. With this, the bolt having been sent out from the part stopping/passing unit is reliably fed to the holding head or the holding unit, and impact of the bolt on the holding head or the holding unit can be alleviated.

The holding unit typically has a structure such as an open/close type chuck mechanism. However, when a bolt collides at high speed with a portion of such a mechanism, that portion is abnormally worn or broken. However, such collision is eliminated by the stop/passage function of the part stopping/passing unit, thereby being capable of improving durability of the screw fastening device.

The present invention relates to the part stopping/passing unit and the screw fastening device described above. However, as will be apparent from the embodiments described below, the present invention can also exist as the method invention specifying the course of actions of the part.

DESCRIPTION OF EMBODIMENTS

Next, description is made of a part stopping/passing unit and a screw fastening device according to embodiments of the present invention.

First Embodiment

Figure 1A:
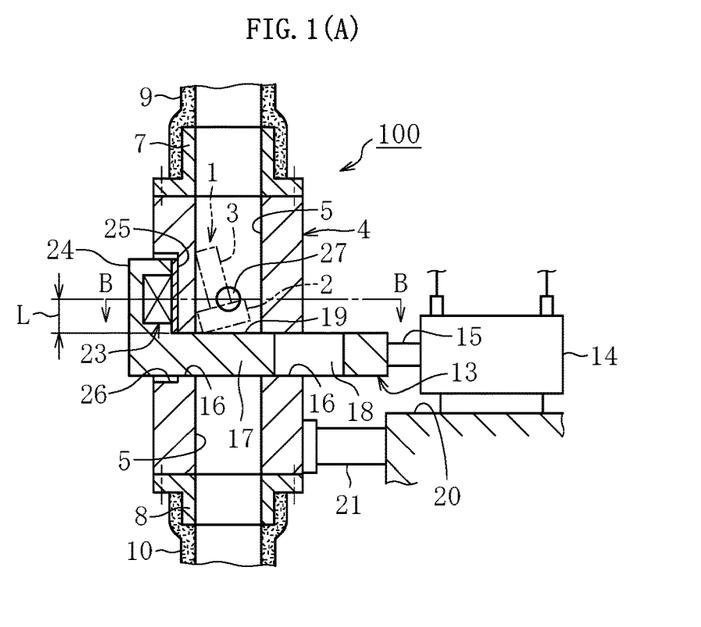
FIG. 1A is a vertical sectional view of a part stopping/passing unit.
Figure 1B:
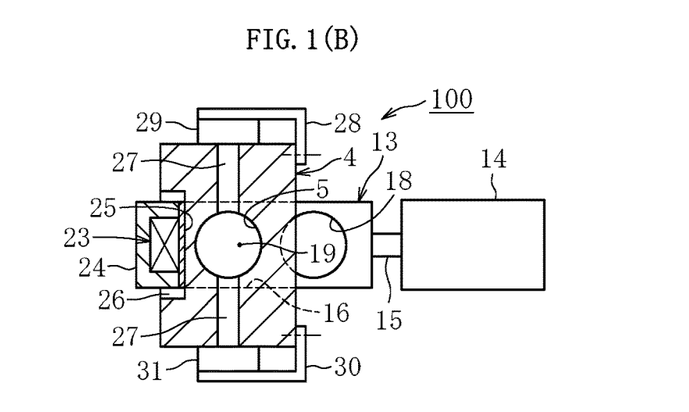
FIG. 1B is a transverse sectional view of the part stopping/passing unit.
Figure 1C:
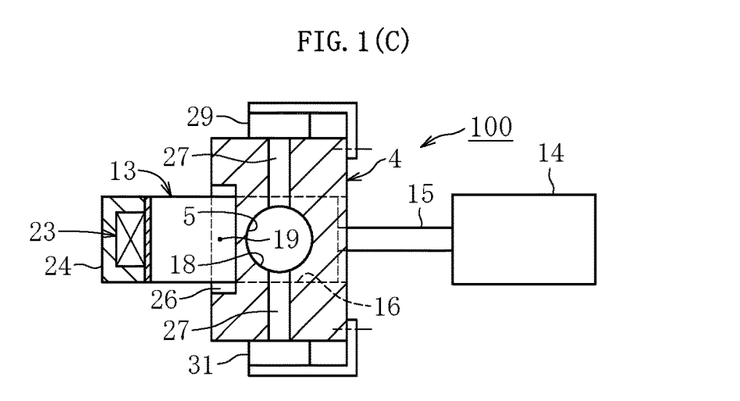
FIG. 1C is a transverse sectional view of the part stopping/passing unit.
Figure 2:
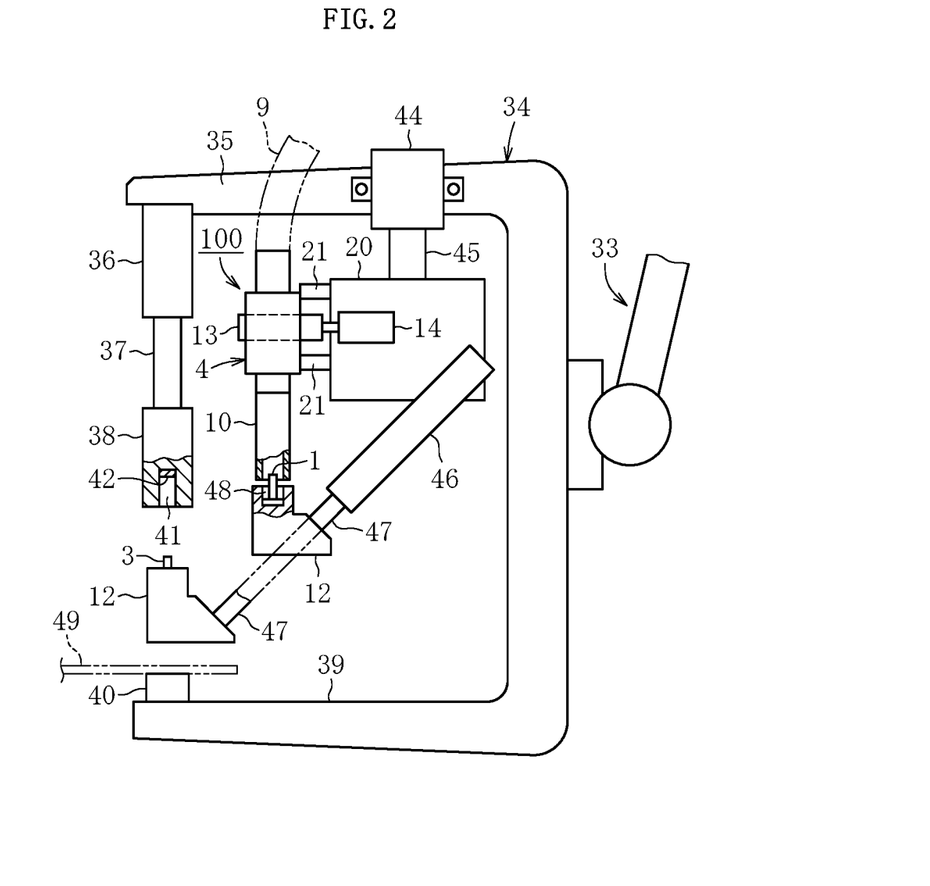
FIG. 2 is a side view for illustrating a case in which the part stopping/passing unit is mounted to a C-gun type welding machine.

FIG. 1 and FIG. 2 are illustrations of a first embodiment of the present invention.

First, description is made of a part.

There are various types of parts which are allowed to pass through the part stopping/passing unit according to the present invention. For example, the parts may comprise a projection bolt with a flange, a bolt having a hexagonal head portion, a shaft-like part with a head portion, and a distance piece having a cylindrical shape. Herein, as indicated by the two-dot chain line in FIG. 1A, the part is a bolt 1 made of iron with a hexagonal head portion, and comprises a head portion 2 and a shaft portion 3 which are integrated with each other. The total length of the bolt 1 is 28 mm.

Next, description is made of a unit main body.

The reference symbol 100 denotes the entirety of the part stopping/passing unit. A core member of the part stopping/passing unit is formed of a unit main body 4, which is manufactured using a block-shaped member having a substantially cuboidal shape. The unit main body 4 is made of a non-magnetic material such as a synthetic resin material, aluminum, or stainless steel so as to cause a magnet attraction force described later to act on the bolt 1 as strong as possible. In this case, the stainless steel is used.

A part passage 5 which is straight in the up-and-down direction is formed at a center portion of the unit main body 4. The part passage 5 has a circular sectional shape, and an inner diameter dimension of the part passage 5 is set so as to allow the head portion 2 to smoothly pass through the part passage 5.

A joint pipe 7 is coupled to an inlet side of the part passage 5 of the unit main body 4 by bolt-fastening, and a joint pipe 8 is coupled to an outlet side of the part passage 5 of the unit main body 4 by bolt-fastening. Feed hoses 9 and 10, which are each made of synthetic resin, are connected to the joint pipe 7 and the joint pipe 8, respectively. The feed hose 9 on the inlet side is connected to a bolt feed source such as a part feeder, and the feed hose 10 on the outlet side extends to reach a target location of the bolt feeding. The target location is, for example, a holding head of a screw fastening machine or a holding head 12 of an electric resistance welding machine described later.

Although illustration is omitted, in order to allow the bolt 1 to be transferred at high speed, conveyance air blows into the part feeder. When the bolt 1 moving at high speed collides with the holding head being the target location, a receiving surface of the holding head may be broken, or the bolt 1 may not be held in a normal posture. Therefore, the part stopping/passing unit 100 temporarily stops the bolt 1 and thereafter feeds the bolt 1 at low speed to the holding head.

As described above, the unit main body 4 is formed of the block-shaped member having the substantially cuboidal shape. However, the unit main body 4 may be formed of a pipe member having a large thickness.

Next, description is made of an opening/closing member.

An opening/closing member 13 has a function of temporarily stopping the bolt 1 having been transferred thereto, and a function of transferring again the bolt 1 having been temporarily stopped. The opening/closing member 13 is configured to advance and retreat, and is formed of an elongated thick plate member. A piston rod 15 of an air cylinder 14 being an advancing/retreating driver is coupled to the opening/closing member 13.

The unit main body 4 has an insertion hole 16 which is formed in a state of being orthogonal to the part passage 5. The insertion hole 16 has a rectangular sectional shape so as to allow the opening/closing member 13 to slide therein in a state of having no gap with the insertion hole 16. The opening/closing member 13 has a solid stopping portion 17 and a passing hole 18 formed adjacent to the stopping portion 17. A top surface of the stopping portion serves as a stopper surface 19 for stopping a part. The opening/closing member 13 has the stopper surface 19 for stopping the bolt 1 having been transferred thereto and the passing hole 18 for allowing a part to pass therethrough.

The passing hole 18 is a circular hole. When the passing hole 18 matches to the part passage 5, a continuous single passage is formed.

An advancing/retreating direction of the air cylinder 14 is set to a direction orthogonal to a longitudinal direction of the part passage 5, and an advancing/retreating direction of the piston rod 15 is also set to the same direction. The air cylinder 14 is fixed to a stationary member 20 such as a machine frame. An electric motor of an advance/retreat output type may also be employed in place of the air cylinder 14. Moreover, the unit main body 4 is coupled to the stationary member 20 through intermediation of a support member 21.

The advance/retreat output of the air cylinder 14 allows the stopper surface 19 to close the part passage 5 and allows the passing hole 18 to open the part passage 5.

Next, description is made of an attracting mechanism.

When the stopper surface 19 takes a part stopping position, the attracting mechanism positions the bolt 1 in a stopping state by an attracting force. When the passing hole 18 takes a part passing position, the bolt 1 is allowed to pass therethrough by elimination of the attraction force.

The attracting mechanism is denoted by the reference symbol 23, and there is used, for example, a permanent magnet, an electromagnet, or air suction. In this case, the permanent magnet is used, and the reference symbol 23 also denotes the permanent magnet. A projecting portion 24 is formed at an end portion of the opening/closing member 13. The permanent magnet 23 is fitted to a recessed hole formed in the projecting portion 24, and a top surface is closed with a cover plate 25.

A recessed portion 26 is formed in a side surface of the unit main body 4, and the permanent magnet 23 enters the recessed portion 26. Through the entry of the permanent magnet 23, the permanent magnet 23 approaches the space of the part passage 5 as close as possible, and strongly attracts the bolt 1. That is, relative positions of the permanent magnet 23 and the stopper surface 19 are set so that the permanent magnet 23 comes closest to the space portion of the part passage 5 when the stopper surface 19 takes the position of closing the part passage 5.

It is required that, when the bolt 1 enters the part passage 5 at high speed, the bolt 1 be prevented from colliding with the stopper surface 19 and being bounced off in a rising direction, that is, be prevented from reversely proceeding. For this reason, a length L between a center line of the permanent magnet 23 (attraction force center line) and the stopper surface 19 is set as small as possible to prevent the bolt 1 from being bounced off from the stopper surface 19.

That is, the bolt 1 having been transferred is received on the stopper surface 19, and is immediately brought into a stopping state in contact with the stopper surface 19 without being bounced off. At the same time, as indicated by the two-dot chain line in FIG. 1A, the bolt 1 is attracted to the inner surface of the part passage 5 on the permanent magnet 23 side. Such operation of stopping the bolt 1 is achieved because the length L is set small so that the bolt 1 is prevented from being bounced off.

In other words, the permanent magnet 23 is arranged at a position lower than a height position of the bolt 1 in contact with the stopper surface 19 so that the length L is set to an appropriate length L. From the time point at which the bolt 1 is brought into abutment against the stopper surface 19, the attraction force toward the inner surface of the part passage 5 always acts on the bolt 1, and hence the bolt 1 is prevented from flying up.

FIG. 1B is an illustration of a cross section taken along the line B-B of FIG. 1A. As is apparent from FIG. 1B, the permanent magnet 23 is arranged at a position closest to the part passage 5, and at the same time, the passing hole 18 is arranged at a position shifted from the part passage 5.

Moreover, as illustrated in FIG. 1C, when the passing hole 18 matches the part passage 5, the permanent magnet 23 is significantly separated apart from the part passage 5, and the attraction magnetic force of the permanent magnet 23 does not act on the bolt 1. Therefore, the bolt 1 moves by its own weight or is transferred by the conveyance air.

Next, description is made of a part sensor.

In order to check whether or not the bolt 1 stops on the stopper surface 19, apart sensor is provided. As the part sensor, there may be employed a part sensor of a type configured to emit a signal in response to contact with the bolt 1, a part sensor configured to emit a signal in response to entry of the bolt 1 in a magnetic field, or apart sensor of a photoelectric type. In this case, the last photoelectric type part sensor is employed.

The unit main body 4 has a through hole 27 which is orthogonal to the part passage 5, and a light beam for detection of the bolt passes through the through hole 27. A light emitter 29 is fixed to a side surface of the unit main body 4 through use of a bracket 28, and a light receiver 31 is fixed to a side surface of the unit main body 4 through use of a bracket 30. The through hole 27 is arranged at a position at which an axis of the through hole 27 passes through the bolt 1 on the stopper surface 19.

Thus, the bolt 1 always stops on the stopper surface 19, and hence the light beam for detection is always radiated to the stopping bolt 1, thereby reliably detecting the presence of the bolt 1.

Next, description is made of an example case of mounting of the part stopping/passing unit.

The part stopping/passing unit 100 is arranged in midway of a bolt feed passage extending to a screw fastening device or a welding electrode so that a part transfer speed is alleviated. In this case, as illustrated in FIG. 2, an electric resistance welding device operated by a robot device is illustrated as an example. A robot device 33 is of a type which is generally employed, and is of a 6-axis type. A U-shaped or a C-shaped welding arm 34 is connected to the robot device 33, and a welding device of a C-gun type is given.

An air cylinder 36 is fixed to a distal end of an upper arm portion 35 of the welding arm 34, and a movable electrode 38 is connected to a piston rod 37 of the air cylinder 36. A fixed electrode 40 is mounted to a distal end of a lower arm portion 39 opposed to the upper arm portion 35.

The movable electrode 38 has a receiving hole 41 for allowing a shaft portion of the projection bolt 1 to be inserted thereinto, and a permanent magnet 42 for preventing the bolt 1 from dropping off is fitted on a depth side of the receiving hole 41.

A base member corresponding to the stationary member 20 described above is also denoted by the same reference symbol 20. The base member 20 is formed of a rectangular thick plate member. An air cylinder 44 is mounted to a side surface of the upper arm portion 35, and the base member 20 is mounted to a piston rod 45 of the air cylinder 44. The base member 20 is raised and lowered in the vertical direction.

The air cylinder 14 and the support member 21 are connected to the base member 20 so that the part stopping/passing unit 100 is integrated to the base member 20. An air cylinder 46 which is arranged so as to be inclined is fixed to the base member 20, and the holding head 12 described above is mounted to a distal end of a piston rod 47 of the air cylinder 46. The holding head 12 has a recessed portion 48, and the bolt 1 having been dropped through the feed hose 10 enters the recessed portion 48.

The bolt 1 is a projection bolt. Therefore, a head portion of the bolt 1 is a flat circular flange, and has a welding projection (not shown) to be welded to a steel plate part 49.

When the bolt 1 having passed through the part stopping/passing unit 100 is received in the recessed portion 48 of the holding head 12, the holding head 12 advances by the operation of the air cylinder 46 so that the bolt 1 is stopped at a position coaxial with the movable electrode 38. Next, the holding head 12 is raised by the operation of the air cylinder 44, and the shaft portion 3 is inserted into the receiving hole 41 and held by the permanent magnet 42. After that, when the holding head 12 returns to an original position, the movable electrode 38 advances to weld the bolt 1 to the steel plate part 49.

In the embodiment described above, illustration of, for example, an air hose connected to each air cylinder and a signal line connected to the part sensor is omitted.

The opening/closing member 13 which is configured to advance and retreat inside the insertion hole 16 is illustrated as an example. However, in place of such a configuration, the opening/closing member 13 may be configured to advance and retreat along a lower end surface of the unit main body 4. Alternatively, the opening/closing member 13 may be formed of a fan-shaped member and be configured to turnabout a main portion. Moreover, a stopper surface and a passing hole may be formed, and the permanent magnet may be mounted. That is, the opening/closing member configured to linearly advance and retreat is changed to an opening/closing member of an arc-motion type.

The following configuration is also possible. That is, the permanent magnet 23 is embedded in the opening/closing member 13 at a portion close to the stopper surface 19 so that the bolt 1 is directly attracted to the stopper surface 19.

In place of the air cylinders of the various types, an electric motor configured to perform the advance/retreat output can be employed. Moreover, the permanent magnets of the various types may be replaced with electromagnets.

The advancing/retreating operation of the air cylinder and the detection operation of the part sensor described above can easily be performed by control methods which are generally employed. A predetermined operation can be secured through a combination of, for example, an air switching valve configured to operate in accordance with a signal from a control device or a sequence circuit and a sensor configured to emit a signal at a predetermined position of the air cylinder and transmit the signal to the control device.

Actions and effects of the first embodiment described above are as follows.

When the bolt 1 is to be stopped, the opening/closing member 13 moves so that the stopper surface 19 closes the part passage 5. At the same time, the permanent magnet 23 of the attracting mechanism takes the part attracting position. Thus, the bolt 1 having been stopped by the stopper surface 19 receives the attraction force of the permanent magnet 23 under the state in which the bolt 1 is held in contact with the stopper surface 19. Therefore, even when the bolt 1 collides with the stopper surface 19, the bolt 1 is prevented from being bounced off, and is positioned at a predetermined position in contact with the stopper surface 19.

When the stopper surface 19 closes the part passage 5, the permanent magnet 23 is positioned close to the part passage 5. With such a configuration, the attracting force of the permanent magnet 23 reliably acts on the bolt 1 so that the bolt 1 is positioned at a position in contact with the stopper surface 19. Moreover, when the passing hole 18 opens the part passage 5, the permanent magnet 23 is positioned at a position separated apart from the part passage 5. With such a configuration, the attracting force of the permanent magnet 23 with respect to the bolt 1 is substantially eliminated, and hence the bolt 1 is allowed to pass through the passing hole.

The bolt 1 is attracted to the permanent magnet 23 under the state in which the bolt 1 is held in contact with the stopper surface 19. Therefore, the bolt 1 is evenly held in the stopping posture. Thus, when the passing hole 18 is opened, the bolt 1 passes through the passing hole 18 in a normal posture so that the bolt is normally transferred. In particular, when the bolt 1 held in contact with the stopper surface 19 by the permanent magnet 23 is attracted to the inner surface of the part passage 5, the stopping posture of the bolt 1 can always be kept constant, thereby being capable of normally maintaining the posture of the part when the part passes through the passing hole 18.

The bolt 1 is positioned at the position in contact with the stopper surface 19, and hence the presence of the bolt 1 is reliably detected. That is, the stopping position of the bolt 1 is always at the constant position. Thus, the part sensor can easily be arranged, and a stable sensor operation can be assured at the same time.

When the attracting mechanism 23 is formed of the permanent magnet or the electromagnet, various arrangement positions of the attracting mechanism 23 corresponding to the part passage 5 and a motion path of the attracting mechanism 23 adapted to such arrangement position can be freely selected. Thus, the part stopping/passing unit 100 can easily be arranged at a location limited in space.

The part passage 5 is formed in the unit main body 4, and the insertion hole 16 for allowing the opening/closing member 13 to advance and retreat in a state of being orthogonal to the part passage 5 is formed in the unit main body 4. Therefore, for example, when the unit main body 4 is formed of a cuboidal block-shaped member, it is only required that the part passage 5 and the insertion hole 16 be formed in a crossing state in the unit main body 4. With this, manufacturing processing is simplified, thereby improving economic efficiency in terms of manufacturing.

The part passage 5 and the insertion hole 16 are formed in the crossing positional relationship in the unit main body 4, and the opening/closing member 13 inserted into the insertion hole 16 comprises the stopper surface 19, the passing hole 18, and the attracting mechanism 23. When the stopper surface 19 takes the position of closing the part passage 5, the attracting mechanism 23 positions the bolt 1. When the passing hole 18 opens the part passage 5, the attraction force of the attracting mechanism 23 does not act on the bolt 1. Thus, use of the opening/closing member 13 being a single member comprising the three components including the stopper surface 19, the passing hole 18, and the attracting mechanism 23 allows appropriate stopping and passing of the bolt 1. Therefore, accurate stopping and passing operations are performed with the simplified configuration having a unit structure mainly comprising the opening/closing member 13.

Second Embodiment

Figure 3A:
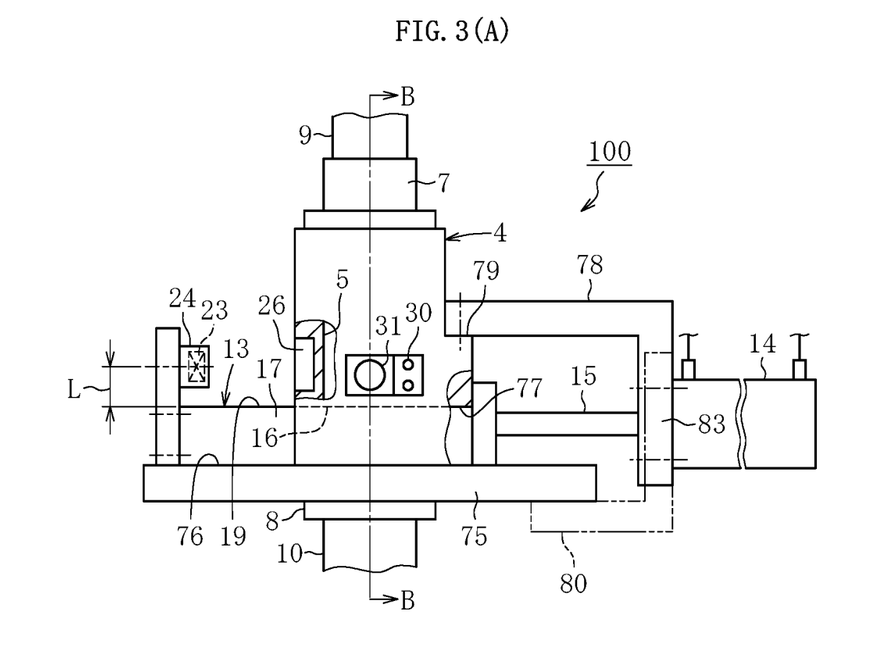
FIG. 3A is a side view of the part stopping/passing unit.
Figure 3B:
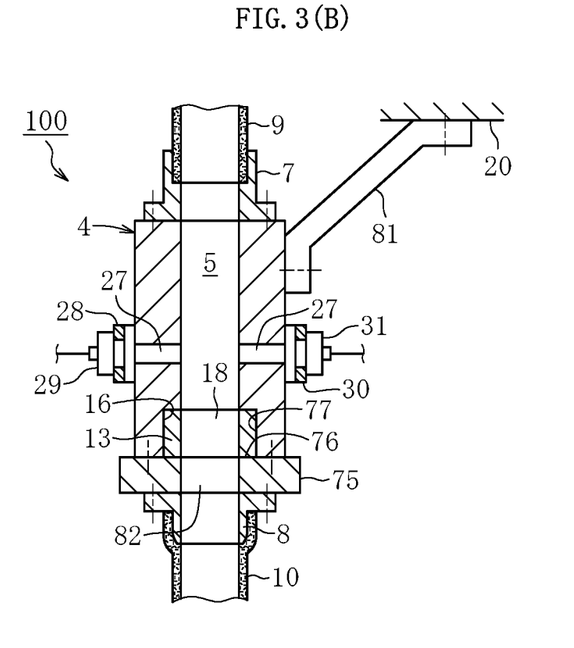
FIG. 3B is a vertical sectional view of the part stopping/passing unit.

FIG. 3A and FIG. 3B are each an illustration of a second embodiment of the present invention.

In the second embodiment, the structure of the first embodiment is formed into more practical structure. A support base member 75 is formed of a thick and flat plate member made of stainless steel, and the unit main body 4 is formed of a substantially cuboidal block-shaped member. A flat lower end surface, that is, an end portion of the unit main body 4 is held in close contact with a top surface 76 of the support base member 75, and the unit main body 4 and the support base member 75 are integrated by bolt-fastening.

As illustrated in FIG. 3B, the support base member 75 has a circular part passing hole 82 formed so as to be communicable with the passing hole 18 of the opening/closing member 13.

A recessed groove 77 is formed at a lower end portion of the unit main body 4, and the unit main body 4 is connected to the support base member 75 so that the insertion hole 16 having a rectangular cross section, which is a closed cross section, is formed. The opening/closing member 13 is inserted into the insertion hole 16 without any gap so as to be capable of advancing and retreating. When the opening/closing member 13 advances and retreats, the opening/closing member 13 slides on the top surface 76 of the support base member 75.

The air cylinder 14 as an advancing/retreating driver is connected to the unit main body 4 through intermediation of a support member 78. The support member 78 is formed of an L-shaped plate member. One end of the support member 78 is bolt-fastened to a step portion 79 of the unit main body 4, and the air cylinder 14 is bolt-fastened to a vertical plate member 83 on another end side.

As indicated by the two-dot chain line in FIG. 3A, in place of the support member 78, a support member 80 connected to the support base member 75 may also be used. The support member 80 has an L-shape similarly to the support member 78, and an orientation of mounting is reverse to that of the support member 78.

The part stopping/passing unit 100 is connected to the stationary member 20 through intermediation of a support arm 81. The support arm 81 has one end connected to an outer surface of the unit main body 4 by bolt-fastening or another method, and another end is connected to the stationary member 20. Meanwhile, the part stopping/passing unit 100 can be coupled to the stationary member 20 through intermediation of the support arm 81 arranged between the support base member 75 and the stationary member 20. Other configurations, which include portions not illustrated in the figures, are the same as those of the first embodiment, and members having the same functions are denoted by the same reference symbols.

Actions and effects of the second embodiment described above are as follows.

Through coupling of the unit main body 4 having the recessed groove 77 to the support base member 75, the insertion hole 16 for allowing the advancing/retreating operation of the opening/closing member 13 is formed. Thus, the insertion hole 16 can easily be formed. Moreover, it is only required that the recessed groove 77 be formed at an end portion of the unit main body 4 by a simple processing method. Thus, processing such as drilling which causes increase in the number of processing steps can be avoided, and hence it is effective for improvement in productivity.

The advancing/retreating driver which is formed of the air cylinder 14 or an advancing/retreating output electric motor is mounted through intermediation of the support member 78, 80 coupled to the unit main body 4 or the support base member 75. Therefore, the integrated structure of the advancing/retreating driver with the unit main body 4 can be secured with a high coupling rigidity, and simplification of the structure can be achieved.

Third Embodiment

Figure 4:
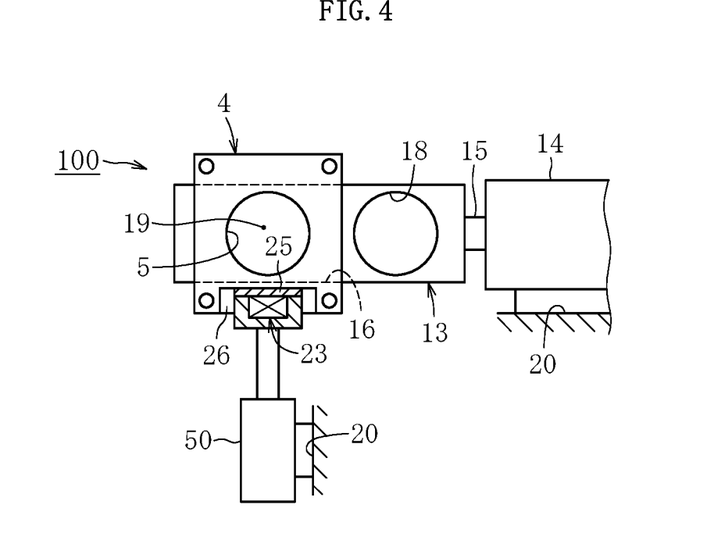
FIG. 4 is a plan view for illustrating another modification example of the unit.

FIG. 4 is an illustration of a third embodiment of the present invention. In FIG. 4, illustration is given in a manner similar to the illustration of the plan view of FIG. 1B or FIG. 1C without the joint pipe 7.

In the third embodiment, the advancing/retreating operation of the opening/closing member 13 and the advancing/retreating operation of the permanent magnet 23 are performed with different air cylinders. The opening/closing member 13 is allowed to advance and retreat by the air cylinder 14, and the permanent magnet 23 is allowed to advance and retreat by another air cylinder 50.

The operations of the air cylinders 14 and 50 are set so as to achieve the following conditions. When the stopper surface 19 closes the part passage 5, the permanent magnet 23 is closest to the space portion of the part passage 5. When the passing hole 18 opens the part passage 5, the permanent magnet 23 is separated apart from the space portion of the part passage 5. Other configurations, which include portions not illustrated in the figure, are the same as those of the previous embodiments, and members having the same functions are denoted by the same reference symbols.

The advancing/retreating operations of the air cylinders 14 and 50 are performed in the manner described above to allow the bolt 1 to stop and pass. Other actions and effects are the same as those of the previous embodiments.

Fourth Embodiment

Figure 5:
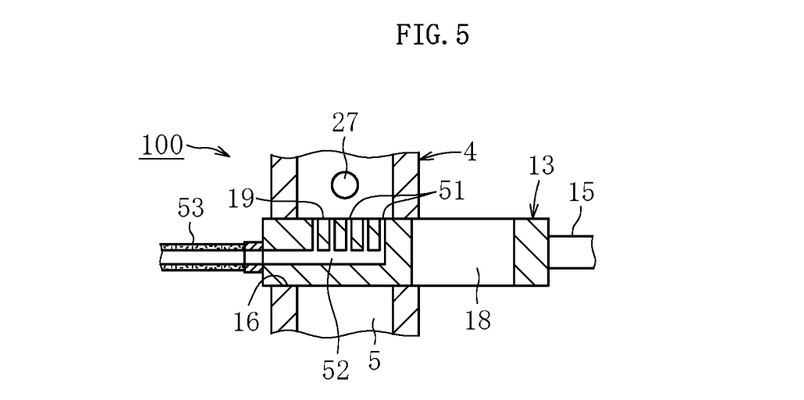
FIG. 5 is a sectional view for illustrating still another modification example of the unit.

FIG. 5 is an illustration of a fourth embodiment of the present invention.

In the fourth embodiment, the attracting mechanism 23 has a structure of using suction air. The stopper surface 19 has a large number of suction holes 51, and the suction holes 51 are connected to a suction pump (not shown) through a suction passage 52 and a suction hose 53. Other configurations, which include portions not illustrated in the figure, are the same as those of the previous embodiments, and members having the same functions are denoted by the same reference symbols.

When the bolt 1 is to be received, the stopper surface 19 closes the part passage 5, and air suction is performed. Even when the bolt 1 is transferred at high speed, the bolt 1 is prevented from being bounced off, and is received and stopped by the stopper surface 19. The attraction force of the air suction maintains the attraction force for the bolt 1 with respect to the stopper surface 19. Meanwhile, when the passing hole 18 opens the part passage 5, the air suction is stopped. Other actions and effects are the same as those of the previous embodiments.

Fifth Embodiment

Figure 6:
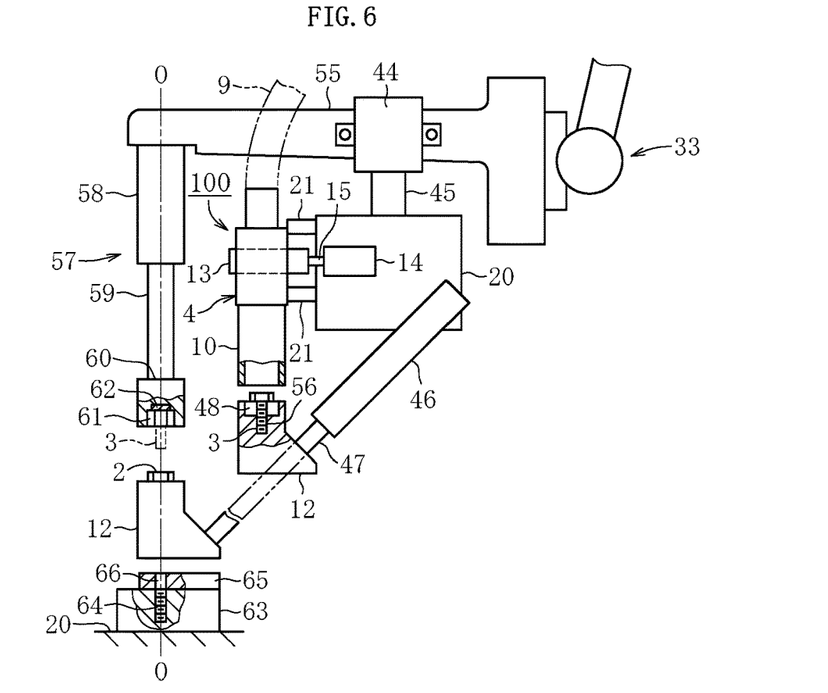
FIG. 6 is a side view of an example case in which the unit is mounted to a screw fastening device.

FIG. 6 is an illustration of a fifth embodiment of the present invention.

In the fifth embodiment, provided is a screw fastening device operated by the robot device 33. An arm-shaped main base member 55 having a sufficient stiffness is connected to the robot device 33. Similarly to the first embodiment, the air cylinder 44 is fixed to the main base member 55. Moreover, for example, the piston rod 45, the base member 20, the part stopping/passing unit 100, the air cylinder 46, and the holding head 12 are arranged.

The head portion 2 of the bolt 1 has a hexagonal shape. The recessed portion 48 of the holding head 12 has a holding hole 56 into which the shaft portion 3 of the bolt 1 is inserted. Dimensions of components are set so that, when the bolt 1 fed from the feed hose 10 is inserted into the holding hole 56, the bolt 1 stops under a state in which the head portion 2 projects from the holding head 12.

A screw fastening unit 57 is mounted to a distal end portion of the main base member 55. The screw fastening unit 57 is of a normal type which is generally used, and comprises an electric motor 58 and a rotary shaft 59 rotated by the electric motor 58. Further, a holding socket 60 is connected to a distal end of the rotary shaft 59. The holding socket 60 has a cup shape, and a holding hole 61 for receiving the head portion 2 having a hexagonal shape is formed in the holding socket 60.

A permanent magnet 62 for preventing the bolt 1 from dropping off is fitted on a depth side of the holding hole 61. A threaded hole 64 is formed in a mating part 63 fixed on the stationary member 20, and a through hole 66 is formed in a part 65 placed on the part 63. The through hole 66 and the threaded hole 64 are positioned on a center axis O-O of the screw fastening unit 57. Other configurations, which include portions not illustrated in the figure, are the same as those of the previous embodiments, and members having the same functions are denoted by the same reference symbols.

Description is made of an operation in the fifth embodiment.

The bolt 1 held by the holding head 12 from the feed hose 10 advances by the operation of the air cylinder 46, and is stopped at a position at which the bolt 1 is coaxial with the center axis O-O. Then, when the head portion 2 of the bolt 1 is inserted into the holding hole 61 by the operation of the air cylinder 44 and attracted by the permanent magnet 62, the holding head 12 returns to an original position. After that, the operation of the robot device 33 causes the bolt 1 to rotate and advance so that the bolt 1 is screwed into the threaded hole 64 through the through hole 66. As a result, the part 65 is fixed to the part 63.

In the fifth embodiment, relative positions of the part stopping/passing unit 100 and the screw fastening unit 57 are accurately set through intermediation of the main base member 55. Further, the robot device allows the part stopping/passing unit 100 and the screw fastening unit 57 to integrally move to a target location. Thus, the impact of the bolt 1 having been delivered at high speed is alleviated, and the bolt 1 is fed to the holding head 12. In this manner, reliable feeding of the bolt is performed. As a result, a screw fastening device which is excellent inoperability is obtained. Other actions and effects are the same as those of the previous embodiments.

Sixth Embodiment

Figures 7A, 7B:
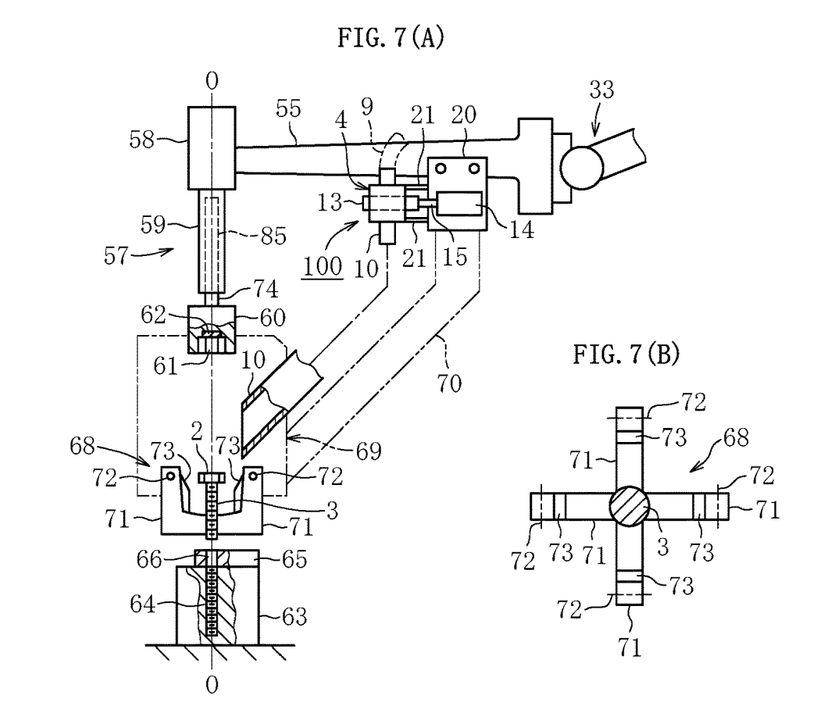
FIG. 7A is a side view of another example case in which the unit is mounted to the screw fastening device.
FIG. 7B is a plan view of a chuck mechanism.

FIG. 7A and FIG. 7B are each an illustration of a sixth embodiment of the present invention.

In the sixth embodiment, provided is a screw fastening device operated by the robot device 33, similarly to the previous fifth embodiment. However, the sixth embodiment is different from the fifth embodiment in that the bolt 1 is temporarily locked at a position coaxial with the screw fastening unit and the holding socket 60 advances to the bolt 1. Therefore, a holding unit 69 is provided.

In the sixth embodiment, unlike the fifth embodiment, the air cylinder 44 is not employed. The base member 20 is directly fixed to the main base member 55, and the part stopping/passing unit 100 is fixed to the main base member 55.

A chuck mechanism 68 arranged on the center axis O-O is provided to the holding unit 69. The holding unit 69 is connected to the base member 20. Various structures may be employed as a method of connecting the holding unit 69 to the base member 20. In this case, a support arm 70 indicated by the two-dot chain line in the figure is employed. The support arm 70 has one end connected to the base member 20 and another end connected to the holding unit 69.

The chuck mechanism 68 is of a type which is generally employed. A plurality of chuck pieces 71 of an open/close type are mounted to the holding unit 69 through intermediation of a support shaft 72 so as to sandwich the shaft portion 3 of the bolt 1. An arrangement position of the chuck mechanism 68 is set so that the shaft portion 3 sandwiched by the chuck pieces 71 is positioned on the center axis O-O.

A drive shaft 74 for rotating the holding socket 60 extends from the rotary shaft 59. Such structure is formed of an advance/retreat mechanism such as a ball screw structure 85 provided between the rotary shaft 59 and the drive shaft 74. This ball screw structure 85 is a mechanism which is generally employed. When the rotary shaft 59 rotates, the drive shaft 74 extends so that the heat portion 2 is held in the holding hole 61, and then the rotational force is transmitted to the drive shaft 74.

Cams 73 are formed on an inner side of the chuck pieces 71, and the chuck pieces 71 are pushed apart from each other by the holding socket 60 having advanced. With this, the head portion 2 of the bolt 1 is held and screwed into the threaded hole 64. The feed hose 10 is increased in length, and the bolt 1 is fed to the chuck mechanism 68. The chuck pieces 71 are pushed apart from each other while the bolt 1 is rotated. After that, the operation of the robot device 33 causes the bolt 1 to reach the threaded hole 64 being the target location.

Typically, the structure such as the chuck mechanism 68 of the open/close type is employed for the holding unit 69. However, when the bolt 1 collides with the portion of such mechanism at high speed, that portion may be abnormally worn or broken. However, the collision described above is eliminated by the stop/passage function of the part stopping/passing unit 100, thereby being capable of improving durability of the screw fastening device.

Other configurations, which include portions not illustrated in the figures, are the same as those of the previous embodiments, and members having the same functions are denoted by the same reference symbols. Moreover, actions and effects are also the same as those of the previous embodiments.

Seventh Embodiment

Figure 8A:
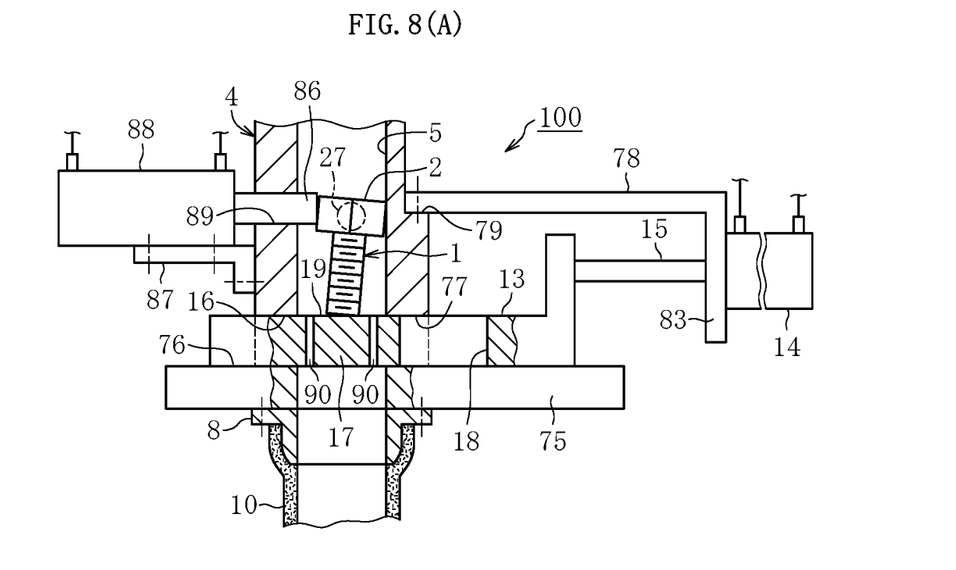
FIG. 8A is a sectional view for illustrating still another modification example of the unit.
Figure 8B:
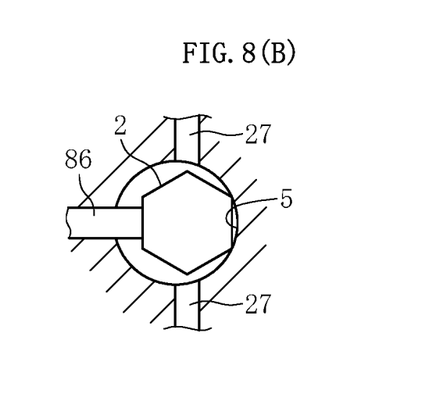
FIG. 8B is a partial sectional view for illustrating a state in which a bolt is pressed by a push rod in the modification example illustrated in FIG. 8A.
Figure 9:
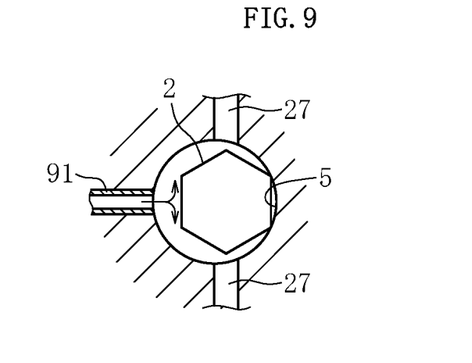
FIG. 9 is a partial sectional view for illustrating still another modification example of the unit, and is an illustration of a state in which a bolt is pressed by air jetting out from an air jet pipe.

FIG. 8 and FIG. 9 are each an illustration of a seventh embodiment of the present invention.

The attracting mechanisms in, for example, the first embodiment, the second embodiment, and the third embodiment are based on the following idea. That is, with respect to a part which is present in the part passage 5, the part is attracted using the attracting mechanism such as the permanent magnet arranged on an outer side of the part passage 5, and the part is pressed against the inner surface of the part passage 5. In other words, the components are arranged in the order of the attracting mechanism, the inner surface of the part passage to which the part is attracted, and the part. That is, the part is pressed in the direction of approaching the attracting mechanism. In such a manner, the part is held in contact with the stopper surface 19, and contact portions with respect to the inner surface of the part passage 5 are evenly set. The part is held in contact with two portions including the stopper surface 19 and the inner surface of the part passage in such a manner so that the stopping position of the part is fixed at a constant position.

As compared to the attracting mechanisms described above, the seventh embodiment is based on the following idea. That is, with respect to a part which is present in the part passage 5, the part is pressed with a pressing mechanism such as a push rod arranged on an outer side of the part passage 5, and the part is pressed against the inner surface of the part passage 5. In other words, the components are arranged in the order of the pressing mechanism, the part, and the inner surface of the part passage to which the part is attracted. That is, the part is pressed in the direction of separating away from the pressing mechanism. In such a manner, the part is held in contact with the stopper surface 19, and contact portions with respect to the inner surface of the part passage 5 are evenly set. The part is held in contact with two portions including the stopper surface 19 and the inner surface of the part passage in such a manner so that the stopping position of the part is fixed at a constant position.

Therefore, description is made of the pressing mechanism.

As the structure of the pressing mechanism, there may be employed various structures in which a push rod or a pressing plate formed of an elongated plate member is used as the pressing member. In this case, a push rod 86 having a circular cross section is employed as the pressing member. An air cylinder 88 is mounted to the unit main body 4 through intermediation of a bracket 87, and a piston rod of the air cylinder 88 is employed as the push rod 86. A mounting posture of the air cylinder 88 is selected so that the push rod 86 enters the part passage 5 through a through hole 89 formed in the unit main body 4 and advances and retreats in the radial direction of the part passage 5. The advance/retreat positions of the push rod 86 are set so that the head portion 2 can be pushed when the bolt 1 is received on the stopper surface 19.

The conveyance air flows out to the outside from a sliding gap between the insertion hole 16 and the opening/closing member 13. Therefore, the air stream obtained by the outflow acts on the bolt 1 received on the stopper surface 19 as a dynamic pressure, and the bolt 1 is maintained in a state of being held in contact with the stopper surface 19. Thus, even when the configuration of FIG. 8A is reversed up and down, the bolt 1 does not return back. In the seventh embodiment, in order to more reliably obtain the dynamic pressure described above, an airflow hole 90 is formed in the stopping portion 17. Other configurations, which include portions not illustrated in the figures, are the same as those of the previous embodiments, and members having the same functions are denoted by the same reference symbols.

Until the bolt 1 is conveyed, the push rod 86 waits at a position retreated from the part passage 5. At the same timing as the bolt 1 is conveyed and received on the stopper surface 19, the push rod 86 advances so that the head portion 2 is pressed against the inner surface of the part passage 5. Then, when the bolt 1 is re-transferred from the state of being pressed and stopped, the push rod 86 retreats so that the passing hole 18 matches the part passage 5. Other actions and effects are the same as those of the previous embodiments.

The pressing mechanism illustrated in FIG. 9 is of an air jet type. An air jet pipe 91 is employed in place of the push rod 86. The head portion 2 is pressed against the inner surface of the part passage 5 by blowing air against the head portion 2.

Actions and effects of the seventh embodiment described above are as follows.

When the bolt 1 is to be stopped, the opening/closing member 13 moves so that the stopper surface 19 closes the part passage 5. At the same time, the push rod 86 being the pressing mechanism takes the part pressing position. Thus, the bolt 1 having been stopped by the stopper surface 19 receives the pressing force of the push rod 86 under the state in which the bolt 1 is held in contact with the stopper surface 19. Therefore, even when the bolt 1 collides with the stopper surface 19, the bolt 1 is prevented from being bounced off, and is positioned at a predetermined position in contact with the stopper surface 19.

When the stopper surface 19 closes the part passage 5, the push rod 86 is positioned at a position of pressing the bolt 1. With such a configuration, a pressing force of the push rod 86 reliably acts on the bolt 1, and hence the bolt 1 is positioned at a position in contact with the stopper surface 19.

Moreover, when the passing hole 18 opens the part passage 5, the push rod 86 is positioned at a position separated apart from the part passage 5. With such a configuration, the pressing force of the push rod 86 with respect to the bolt 1 is eliminated, and hence the bolt 1 is allowed to pass through the passing hole.

The bolt 1 is pressed by the push rod 86 under the state in which the bolt 1 is held in contact with the stopper surface 19. Therefore, the bolt 1 is evenly held in the stopping posture. Thus, when the passing hole 18 is opened, the bolt 1 passes through the passing hole 18 in a normal posture so that the bolt is normally transferred. In particular, when the bolt 1 held in contact with the stopper surface 19 by the push rod 86 is pressed against the inner surface of the part passage 5, the stopping posture of the bolt 1 can always be kept constant, thereby being capable of normally maintaining the posture of the part when the part passes through the passing hole 18.

Eighth Embodiment

Figure 10:
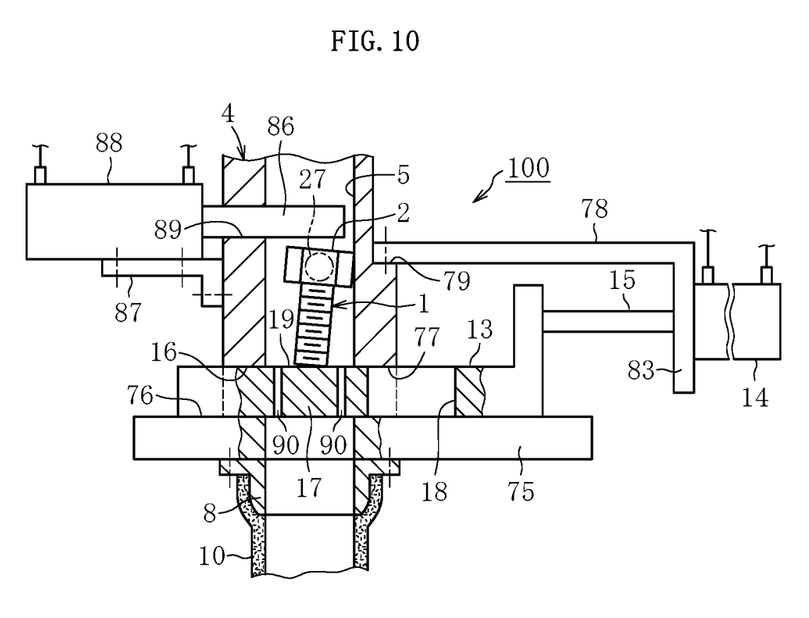
FIG. 10 is a sectional view for illustrating still another modification example of the unit.

FIG. 10 is an illustration of an eighth embodiment of the present invention.

In the eighth embodiment, the push rod 86 is advanced to the upper side of the bolt 1 to prevent returning of the bolt 1. Other configurations, which include portions not illustrated in the figure, are the same as those of the previous embodiments, and members having the same functions are denoted by the same reference symbols. Moreover, other actions and effects are also the same as those of the previous embodiments.

INDUSTRIAL APPLICABILITY

As described above, with the part stopping/passing unit in the present invention, a part having been transferred at high speed is reliably stopped at a predetermined position. Even when the arrangement posture of the part stopping/passing unit is changed in anyway, the stopping position described above can be maintained. Moreover, operation reliability of the screw fastening device is improved. Thus, the present invention is applicable to a wide variety of industrial fields such as a vehicle body welding step for an automobile and a sheet metal welding step for a home electrical appliance.

REFERENCE SIGNS LIST 1 bolt, part
4 unit main body
5 part passage
12 holding head
13 opening/closing member
14 air cylinder, advancing/retreating driver
16 insertion hole
17 stopping portion
18 passing hole
19 stopper surface
23 attracting mechanism, permanent magnet
33 robot device
34 welding arm
51 suction hole
55 main base member
57 screw fastening unit
60 holding socket
68 chuck mechanism
69 holding unit
75 support base member
77 recessed groove
78 support member
80 support member
82 part passing hole
86 pressing mechanism, push rod
91 pressing mechanism, air jet pipe
100 part stopping/passing unit
L length between permanent magnet and stopper surface

The invention claimed is:

1. A part stopping/passing unit comprising:
a unit main body having a part passage;
an opening/closing member configured to open and close the part passage, the opening/closing member comprising a stopper surface for stopping a part and a passing hole for allowing the part to pass therethrough; and
an attracting mechanism, which is configured to position the part by an attracting force when the stopper surface takes a part stopping position, and to allow the part to pass by elimination of the attraction force when the passing hole takes a part passing position,
wherein the attracting mechanism comprises a permanent magnet, which is caused to move between one position where the attracting force of the permanent magnet acts on the part to position the part on the stopper surface, when the opening/closing member closes the part passage, and an other position where the attracting force of the permanent magnet with respect to the part is eliminated to allow the part to pass through the passing hole, when the opening/closing member opens the part passage.

2. The part stopping/passing unit according to claim 1,
wherein an end portion of the unit main body is coupled to a support base member having a part passing hole,
wherein an insertion hole for guiding the opening/closing member is formed by a recessed groove, which is formed at the end portion of the unit main body, and by the support base member, and
wherein an advancing/retreating driver configured to perform an opening/closing operation of the opening/closing member is mounted through intermediation of a support member coupled to the unit main body or the support base member.

3. The part stopping/passing unit according to claim 1, wherein the permanent magnet is provided at the opening/closing member and moves between the one position and the other position accompanied with an operation of the opening/closing member for opening and closing the part passage.

4. A screw fastening device comprising:
the part stopping/passing unit of claim 1 mounted to a main base member, which is coupled to a robot device, for allowing a bolt, as the part, to stop and pass;
a screw fastening unit configured to hold the bolt and screw the bolt into a threaded hole being a target location is mounted to the main base member; and
a holding head configured to hold the bolt at the screw fastening unit or a holding unit configured to temporarily lock the bolt at a position coaxial with the screw fastening unit is arranged on a downstream side of the part stopping/passing unit.

5. A screw fastening device comprising:
the part stopping/passing unit of claim 2 mounted to a main base member, which is coupled to a robot device, for allowing a bolt, as the part, to stop and pass;
a screw fastening unit configured to hold the bolt and screw the bolt into a threaded hole being a target location is mounted to the main base member; and
a holding head configured to hold the bolt at the screw fastening unit or a holding unit configured to temporarily lock the bolt at a position coaxial with the screw fastening unit is arranged on a downstream side of the part stopping/passing unit.

* * * * *